United States Patent
Hill et al.

(10) Patent No.: US 7,991,289 B2
(45) Date of Patent: Aug. 2, 2011

(54) HIGH BANDWIDTH COMMUNICATION SYSTEM AND METHOD

(75) Inventors: Randy W. Hill, Tucson, AZ (US);
Abram G. Young, Tucson, AZ (US);
Justin P. Bergfield, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 676 days.

(21) Appl. No.: 12/058,365

(22) Filed: Mar. 28, 2008

(65) Prior Publication Data
US 2009/0245811 A1 Oct. 1, 2009

(51) Int. Cl.
*H04B 10/00* (2006.01)

(52) U.S. Cl. .......................................................... 398/82

(58) Field of Classification Search .................. None
See application file for complete search history.

(56) References Cited

U.S. PATENT DOCUMENTS

| | | | |
|---|---|---|---|
| 4,112,401 A | 9/1978 | Palmer et al. | |
| 5,526,449 A * | 6/1996 | Meade et al. | 385/14 |
| 5,937,118 A * | 8/1999 | Komori | 385/27 |
| 5,999,308 A * | 12/1999 | Nelson et al. | 359/321 |
| 6,002,522 A * | 12/1999 | Todori et al. | 359/573 |
| 6,014,246 A * | 1/2000 | Asher et al. | 359/288 |
| 6,097,870 A * | 8/2000 | Ranka et al. | 385/127 |
| 6,134,369 A * | 10/2000 | Kurosawa | 385/132 |
| 6,175,671 B1 * | 1/2001 | Roberts | 385/14 |
| 6,618,535 B1 * | 9/2003 | Reynolds | 385/129 |
| 6,738,551 B2 * | 5/2004 | Noda et al. | 385/130 |
| 6,791,732 B2 * | 9/2004 | Simon | 359/237 |
| 6,819,845 B2 * | 11/2004 | Lee et al. | 385/122 |
| 6,853,760 B2 * | 2/2005 | Sekine et al. | 385/14 |
| 6,891,993 B2 * | 5/2005 | Prather et al. | 385/24 |
| 6,917,431 B2 * | 7/2005 | Soljacic et al. | 356/477 |
| 6,993,216 B2 * | 1/2006 | Platzman et al. | 385/16 |
| 7,050,659 B1 * | 5/2006 | Williams et al. | 385/5 |
| 7,079,309 B1 * | 7/2006 | Lin et al. | 359/333 |
| 7,120,344 B2 * | 10/2006 | Noda et al. | 385/129 |
| 7,184,638 B2 * | 2/2007 | Noda et al. | 385/129 |
| 7,212,140 B2 * | 5/2007 | Soderberg et al. | 341/137 |
| 7,307,732 B2 * | 12/2007 | Beausoleil | 356/477 |
| 7,310,182 B2 * | 12/2007 | Salib | 359/321 |
| 7,351,601 B2 * | 4/2008 | Scherer | 438/31 |
| 7,428,352 B2 * | 9/2008 | Noda et al. | 385/16 |
| 7,466,884 B2 * | 12/2008 | Beausoleil | 385/49 |
| 7,561,761 B2 * | 7/2009 | Sigalas et al. | 385/8 |
| 7,590,325 B2 * | 9/2009 | Noda et al. | 385/129 |

(Continued)

*Primary Examiner* — Agustin Bello
(74) *Attorney, Agent, or Firm* — Renner, Otto, Boisselle & Sklar, LLP (57) ABSTRACT

A communication system (20) includes a transmitter (22) with (i) a transmitter photonic crystal (30) having a waveguide (40) and multiple cavities (42, 44, and 46) spaced along the waveguide (40); (ii) a light source (32); and (iii) a controller (34) that controls the cavities (42, 44, and 46) to translate multiple electronic data bits to optical data bits simultaneously in respective cavities (42, 44, and 46) illuminated by the light source (32). A corresponding receiver (24) includes a receiver photonic crystal (92) having a data/key waveguide (104) for receiving a data/key signal and a latch waveguide (106) for receiving a latch signal. The photonic crystal (92) also includes data readout cavities (110, 112, 114, and 116) and lock cavities (160, 162, and 164) adapted to compare the key bits to respective lock bits. The data readout cavities (110, 112, 114, and 116) are spaced to read out the data bits simultaneously if (a) the data/key signal and the latch signal are received simultaneously, (b) the data/key signal and the latch signal have the same length, and (c) the key bits in the key/data signal match the lock bits.

19 Claims, 9 Drawing Sheets

U.S. PATENT DOCUMENTS

| | | | |
|---|---|---|---|
| 7,657,188 B2* | 2/2010 | Covey | 398/182 |
| 7,720,326 B2* | 5/2010 | Wu et al. | 385/14 |
| 7,720,377 B2* | 5/2010 | Snider et al. | 398/45 |
| 7,738,749 B2* | 6/2010 | Noda et al. | 385/24 |
| 7,772,606 B2* | 8/2010 | Cao et al. | 257/98 |
| 2002/0021878 A1* | 2/2002 | Allan et al. | 385/129 |
| 2002/0048422 A1* | 4/2002 | Cotteverte et al. | 385/4 |
| 2002/0191905 A1* | 12/2002 | Prather et al. | 385/24 |
| 2003/0142902 A1* | 7/2003 | Sugitatsu | 385/27 |
| 2004/0008945 A1* | 1/2004 | Sigalas | 385/45 |
| 2004/0062505 A1* | 4/2004 | Sugitatsu et al. | 385/131 |
| 2004/0175174 A1* | 9/2004 | Suhami | 398/43 |
| 2005/0082480 A1 | 4/2005 | Wagner et al. | |
| 2005/0185966 A1* | 8/2005 | Salib | 398/164 |
| 2008/0112703 A1* | 5/2008 | Beausoleil et al. | 398/50 |
| 2008/0185057 A1* | 8/2008 | Prakash et al. | 137/594 |

* cited by examiner

HIGH BANDWIDTH COMMUNICATION SYSTEM AND METHOD

FIELD OF THE INVENTION

This invention relates generally to a high bandwidth communication system and method, and more particularly, to a system and method employing photonic bandgap crystal properties to greatly increase the data transmission rate.

BACKGROUND

Existing optical communication systems typically operate at a transmission rate of about ten gigabits per second and employ temporal or time-based modulation to transmit data over fiber optic telecommunication lines. A source of light, such as a laser, is rapidly switched on and off, "modulated," to translate a stream of electronic data to an optical data stream for transmission. When the data stream reaches its destination, a receiver or demodulator reads the data stream and converts the optical data into a stream of electronic data, data that can be operated on by common computers.

SUMMARY

Temporal modulation is limited by physical constraints inherent in the materials and structure of existing systems. The present invention provides a system and method that employ a photonic crystal structure to provide spatial rather than temporal modulation to greatly increase the speed of optical data transmission. Data communication speeds are increased by spatially modulating and demodulating a plurality of data bits to and from electronic and optical formats substantially simultaneously. This process can be thought of as modulating and demodulating the data bits in parallel rather than serially as in temporal modulation and demodulation. In other words, rather than translating the electronic data to optical data one bit at a time, multiple bits are translated in parallel at the same time, which is much faster.

Optical communication systems generally are more durable and robust than electronic communication systems because they employ fewer moving parts. The present invention, for example, potentially can eliminate electronic switches, routers, and other electronic equipment at and between network nodes.

The present invention also can provide further security advantages over both electronic communication systems and previous optical communication systems by providing data receivers with a structure that physically encodes a security key. This makes communications very secure, particularly since it does not preclude further encryption of the transmitted data. The data receivers also can detect whether the transmitted signal has been read, thereby alerting the receiver to attempts to circumvent security provisions or other system problems.

An exemplary optical signal transmitter provided in accordance with the present invention includes (i) a photonic crystal having a waveguide and a plurality of defect sites spaced along the waveguide; (ii) a light source arranged to direct light to the photonic crystal; and (iii) a controller that controls the defect sites in the photonic crystal to translate electronic data bits to optical data bits in respective defect sites illuminated by the light source. The waveguide includes a main channel and a plurality of branch channels, and the length of each branch channel is selected to sequentially space optical data bits as they travel along the branch and main channels of the waveguide and out of the photonic crystal as a substantially continuous optical signal The present invention also provides an optical signal receiver with an optical-to-electronic signal decoder; and a photonic crystal having a waveguide for receiving an optical signal having a plurality of optical data bits. The photonic crystal also has a plurality of resonant cavities spaced along the waveguide to read out the optical data bits simultaneously along separate paths to a decoder that translates the optical data bits to electronic data bits.

An exemplary method for transmitting optical data includes the steps (i) translating electronic data bits into optical data bits substantially simultaneously, (ii) spatially sequencing the optical data bits into an optical signal, and (iii) transmitting the optical signal.

An exemplary method for receiving optical data includes the steps of (i) receiving an optical signal having a sequence of spatially sequenced optical data bits; and (ii) reading the spaced optical data bits out of the optical signal substantially simultaneously.

The present invention also provides an optical data receiver whose physical structure provides signal security. An exemplary receiver includes a photonic crystal having a data/key waveguide for receiving a data/key signal and a latch waveguide for receiving a latch signal. The data/key signal includes a plurality of spaced apart bits that include one or more data bits and one or more key bits. The photonic crystal also includes one or more lock cavities adapted to compare the key bits to respective lock bits, and one or more data readout cavities. The data readout cavities are spaced to read out the data bits simultaneously if (a) the data/key signal and the latch signal are received simultaneously, (b) the data/key signal and the latch signal have the same length, and (c) the key data bits in the key/data signal match the lock data bits.

An exemplary data transmission method includes the step of transmitting a data/key signal and a latch signal simultaneously along parallel communication paths. The data/key signal has a length and includes at least two spatially displaced data bits, and the latch signal has the same overall length as the data/key signal.

An exemplary data reception method includes the steps of (i) receiving a data/key signal and a latch signal along parallel communication paths. As above, the data/key signal includes one or more data bits and one or more key bits. The method also includes the step of (ii) reading out the data bits from the key/data signal when (a) the data/key signal and the latch signal are received simultaneously, (b) the data/key signal and the latch signal have the same length, and (c) the key data bits in the key/data signal match predetermined lock data bits.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

The present invention provides systems and methods that can deliver improved communication speed and/or security. Data communication speeds are increased by using light to transmit the data and by employing spatial modulation and demodulation of the data to and from electronic and optical forms. And providing data receivers with a structure that physically encodes a security key makes communications very secure, particularly since it does not preclude further encryption of the transmitted data. The data receivers also can detect whether the transmitted signal has been read, thereby alerting the receiver to attempts to circumvent security provisions or to other system problems. The use of specially-designed photonic crystals is what makes this system work.

The communication system described herein uses spatial modulation to translate electronic data to optical data for transmission at a rate of up to about forty gigabits per second, while existing optical communications systems employing temporal modulation techniques operate at a data transmission rate of about ten gigabits per second. In temporal modulation, a single source is turned on and off to create a stream of bits. In the spatial modulation technique described in the following paragraphs, multiple photonic crystal cavities are spaced along a waveguide and are "flashed" at the same time to generate multiple optical data bits simultaneously. Thus, the communication system described herein can provide orders of magnitude increase over existing communication system transmission rates.

Figure 1:
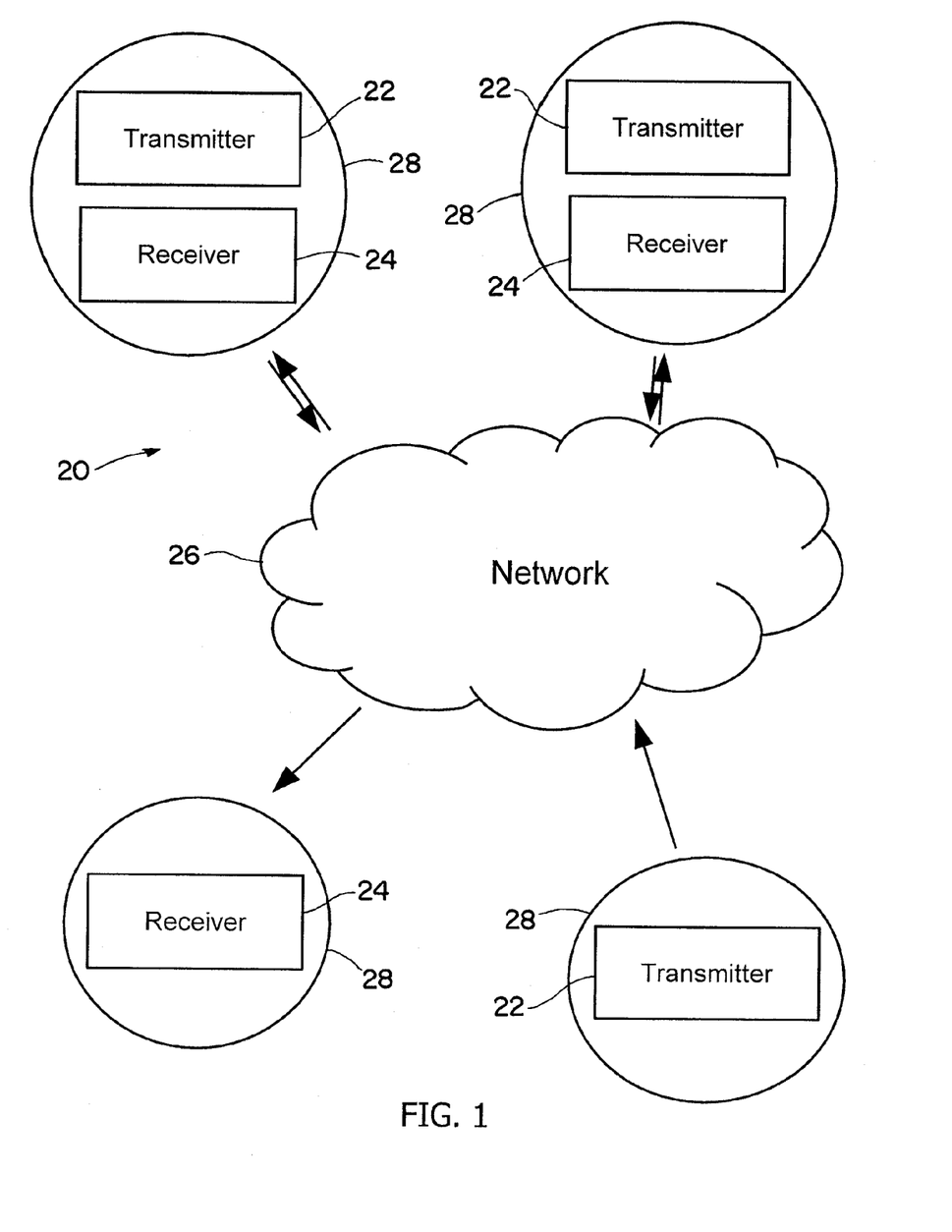
FIG. 1 is a schematic view of an exemplary communication system provided in accordance with the present invention.

Referring now to the drawings in detail, and initially to FIG. 1, an exemplary communication system 20 includes an optical transmitter 22 and an optical receiver 24 connected via a communications network 26. The network 26 has multiple nodes 28, each of which includes at least one of a transmitter 22, a receiver 24, or both. Moreover, each node 28 in the network 26 can include a transmitter-receiver pair 22 and 24, or some or all of the network nodes 28 can include only a transmitter 22 or a receiver 24. In any case, the system 20 can include multiple transmitters 22 and/or multiple receivers 24.

Transmitter

Figure 2:
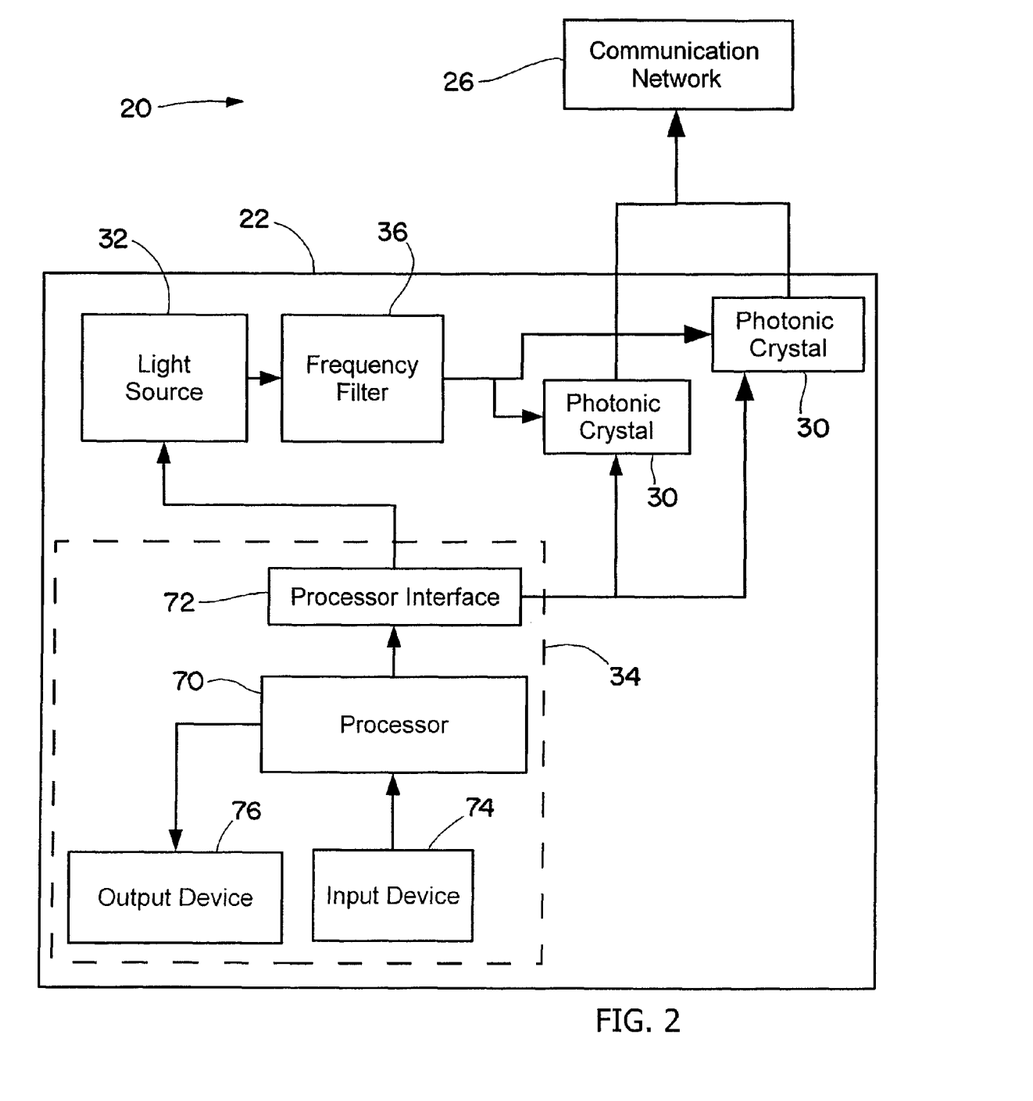
FIG. 2 is a schematic view of an exemplary optical signal transmitter for use in the communication system of FIG. 1.

An exemplary transmitter 22, shown in FIG. 2, includes a data-transmitting photonic crystal 30, a light source 32 arranged to direct light to the photonic crystal 30, and a controller 34 that controls the light source 32 and the photonic crystal 30 to output the desired optical signal. To transmit a greater amount of data, the transmitter 22 can include multiple photonic crystals 30 and the light source 32 can illuminate each photonic crystal 30 with a different frequency of light. Using multiple frequencies greatly increases the amount of data that the transmitter 22 can transmit to the network by providing parallel data transmission across multiple frequencies. These multiple frequencies can be carried on a common optical fiber cable. The following description of the structure and operation of a single photonic crystal and a single frequency of light applies to any photonic crystal in a transmitter with one or multiple photonic crystals illuminated by the light source.

Light Source

The light source 32 supplies the photonic crystal 30 with light at a predetermined frequency and wavelength. "Light" means electromagnetic energy, and includes x-rays to ultraviolet to infrared and everything in between and beyond. An exemplary light for use in conjunction with the present invention has a wavelength of about 1500 nanometers (nm). A laser, such as a coherent mode-locked titanium-sapphire diode-pumped solid state laser, is one example of an exemplary light source.

If the light source 32, such as a broadband laser, generates multiple frequencies of light, a frequency filter 36 can be employed to filter out a frequency or a frequency band to pass on to the data-transmitting photonic crystal 30. Multiple frequencies or frequency bands can be separated out and directed to respective photonic crystals. In practice, a narrow frequency band is substantially equivalent to a discrete frequency. For purposes of this description, the terms "frequency" and "frequency band" are interchangeable. Alternatively, if the one or more light sources each produce light in a narrow frequency band, each of a plurality of light sources can be paired with a respective one of a plurality of photonic crystals.

The laser or other light source 32 and a frequency filter 36, if any, can be integrated into a microprocessor chip with lithography techniques used in semiconductor construction. The combined semiconductor device eliminates the need for separate optical devices. The light source 32 also can include mirrors and/or lenses for directing the light to the data-transmitting photonic crystal or crystals 30. An exemplary frequency filter 36 includes a frequency-filtering photonic crystal (not shown) with one or more channel defects that filter and guide a respective frequency band to a data-transmitting photonic crystal 30, one example of which is described below.

Photonic Crystal

The light source 32 illuminates the photonic crystal 30 substantially continuously rather than being turned on and off to create data bits. The light source 32 provides the light energy that the photonic crystal 30 uses to generate photonic data bits (also referred to as optical data bits). Accordingly, the photonic crystal 30 in the transmitter 22 is referred to as a data-transmitting photonic crystal.

A crystal has a repeating pattern of atoms, ions, or molecules with generally fixed distances between constituent parts. A photonic crystal, also called a photonic bandgap crystal, is characterized by dielectric materials with different refractive indices. One of these dielectric materials has substantially uniformly sized and shaped elements arranged in a pattern, with these elements generally spaced apart at about half the wavelength with which the photonic crystal will be used.

Figure 3:
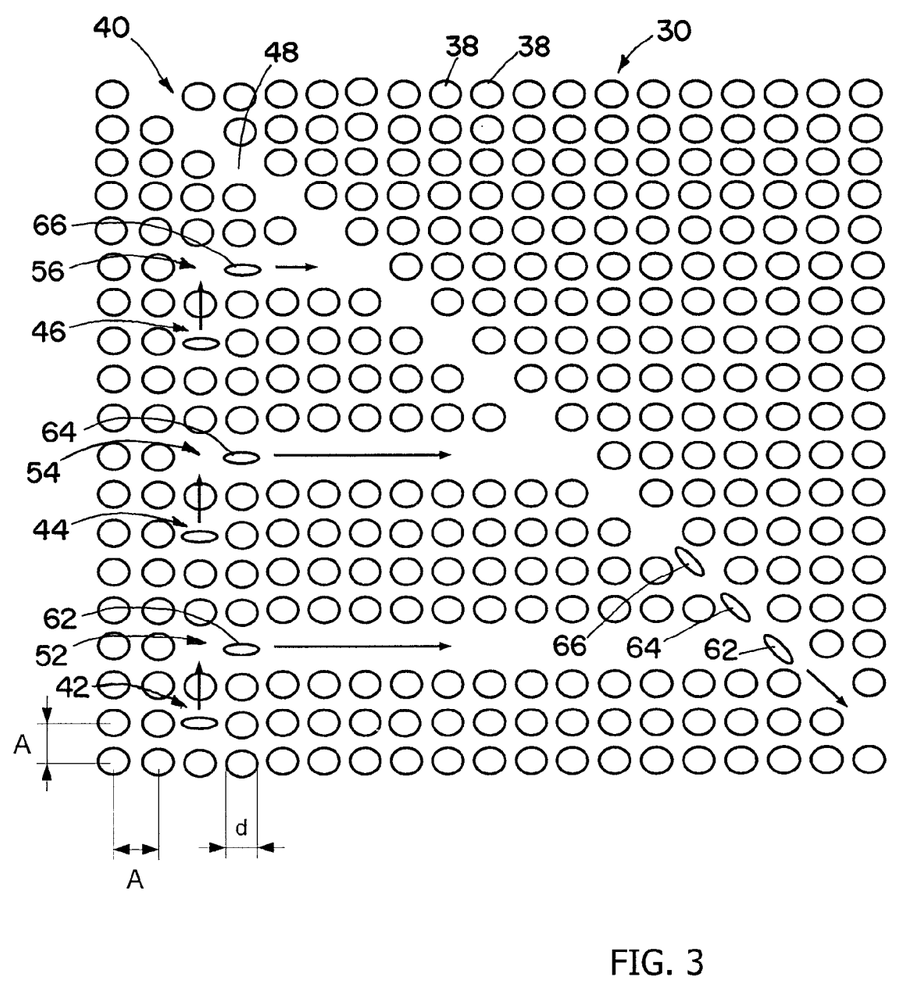
FIG. 3 is a plan view of an exemplary photonic crystal for use in the transmitter of FIG. 2.

In FIG. 3, a portion of an exemplary transmitter photonic crystal 30 is shown with circular elements 38 having a diameter d spaced a uniform distance A in each of two orthogonal directions. Defects interrupt the pattern and provide the ability to control the light in the crystal. These defects include point source and line defects. Point source defects include cavities where an element in the pattern is missing, or deviations in the uniformity of the size, shape, and/or spacing of the elements in the pattern. Line or channel defects include a linear array of point source defects and can form waveguides along which light travels.

As shown in FIG. 3, the photonic crystal 30 includes a waveguide 40 and a plurality of defect sites 42, 44, and 46 spaced along the waveguide 40. The illustrated defect sites 42, 44, and 46 are cavities or "holes" in the repeating pattern of the photonic crystal, and each cavity corresponds to a bit in a multi-bit signal to be transmitted.

The waveguide 40 includes a main channel 48 and a plurality of branch channels 52, 54, and 56. The main channel 48 and the branch channels 52, 54, and 56 are defined by line defects. The length of each branch channel 52, 54, and 56 is selected to sequentially space the optical data bits 62, 64, and 66 generated in the cavities 42, 44, and 46 so that they propagate and arrive at the end of the main channel 48 in the proper order and with proper bit spacing. In the illustrated layout, the length of each branch channel 52, 54, and 56 is progressively shorter the further that channel is from an output end of the main channel 48.

Lithography techniques employed in the semiconductor industry can be used to make photonic crystals with communication wavelengths of about 1,500 nanometers. The 1,500 nanometer communications wavelength facilitates integrating existing digital encryption techniques with the receiver and the transmitter. An exemplary photonic crystal is made of aluminum-gallium-Arsenide (AlGaAs) with a non-linear response at about a 1.5 micrometer wavelength.

Controller

Returning to FIG. 2 for a moment, the photonic crystal 30 is one part of the transmitter 22 that generates the optical data bits, and the controller 34, connected to both the light source 32 and the photonic crystal 30, controls the light source 32 and the photonic crystal 30 to convert electronic data into optical data. The controller 34 also controls the timing of the optical data signal transmission over the communications network 26.

The controller 34 is connected to or incorporates a processor 70 and a processor interface 72 that connects the processor 70 to the photonic crystal 30 and the light source 32. The processor 70 also is connected to an input device 74 to receive the data to be communicated. The input device 74 can include a user terminal, a keyboard, a data memory device, an input for a signal from another local or remote device, etc. The processor 70 also can be connected to an output device 76, such as a monitor or other display, a speaker, or a communication link to a device at a remote location.

The controller 34 controls the photonic crystal 30 to create a data signal that includes data words made up of one or more data bits. These bits are the ones and zeros that represent the binary electronic data received in the processor 70 for transmission. Each bit is represented by a bit state (one or zero) in a cavity or other point defect of the photonic crystal in which the applied frequency of light can resonate, creating a binary one, or not resonate, creating a binary zero. "Optical data" includes data bits represented by light, and an optical signal includes one or more optical data bits. Each cavity also has an adjustable Q bias that can compensate for manufacturing non-uniformities and thermal variations in the photonic crystal over time.

The controller 34, more particularly, controls the photonic crystal 30 to translate electronic data bits to optical data bits in respective cavities 42, 44, and 46 (FIG. 3), for example, when they are illuminated by the light source 32. The controller 34 takes advantage of the piezoelectric effect to expand or contract the photonic crystal 30 and thus change the bandgap frequency. By applying a voltage across the photonic crystal 30, the controller 34 controls whether a cavity 42, 44, or 46 (FIG. 3), for example, will have the proper size for the operating frequency of the illuminating light to resonate, and thus whether energy builds up in a particular cavity. This is referred to as cavity Q control. The photonic crystal 30 can be calibrated by modifying each cell's Q-factor via processor bias control.

The data input into the photonic crystal 30 only passes out of the crystal when a high voltage is present. If a low voltage is applied, the light is not allowed to resonate and dissipates over time. A low voltage or no frequency becomes a binary zero, and if a high voltage or a frequency is present it becomes a binary one. So, for example, when a relatively high voltage is applied the light passes into the photonic crystal to transmit the data. And when a relatively low voltage is applied, the light is reflected or not allowed to resonate in a cavity and dissipates. Depending on the photonic crystal design, this relationship can be reversed so that a low voltage allows the light to resonate and a high voltage prevents the light from resonating.

The energy from the light source entrained in the cavities is released substantially simultaneously, whereby the optical data bits jump from the cavities 42, 44, and 46, for example, into respective adjacent branch channels 52, 54, and 56 of the waveguide 40. Each optical bit travels at about the speed of light, but travels a different path length to reach the end of the main channel 48 of the waveguide 40, as illustrated in FIG. 3. The path lengths are selected to place the data bits in the proper sequence and spacing to form a complete optical data signal by the time the bits reach the end of the main channel.

The data signal merges with a similarly-formed key signal that identifies the designated receiver. The key not only identifies the destination for the data, but also indicates how long the data signal before or after the key should be. The key/data signal exits the transmitter 22 and enters the network 26 in parallel with a latch signal, which is a pulse of light of substantially the same length as the length of the combined data signal and key signal. The latch signal is not only the same length as the key/data signal, but is synchronized with the key/data signal so that both signals will arrive at their destination simultaneously. A phase lock loop, for example, can be employed to control timing so that the latch and key/data signals enter the communications network at the same time. Thus there is a latch data packet in parallel with a key/data packet. The length of each data packet is limited by the Kerr non-linearity response and relaxation time, both on the order of about 50 femtoseconds, which allows for data rates of many terabits per second.

The solid-state laser mentioned above, for example, can generate 300 femtosecond pulses at a wavelength of 790 nm, providing an approximately one-terabit-per-second data transmission rate. An exemplary data signal provides a six-bit word with a bit spacing of about 180 microns, providing approximately 1,024 bits in a length of several millimeters.

In summary, the transmitter 22 uses cavity Q control of the data-transmitting photonic crystal 30 to translate the processor's electronic binary data to optical data when the light illuminates the photonic crystal. The optical data signal can be transferred into a high-Q photonic crystal buffer for synchronization of the data/key signal and the latch signal before passing the signals to the communications network 26.

Once the signals are transmitted, the controller 34 can turn the control word to all zeros simultaneously to disable new photons from entering the cavities and enable a parallel photonic crystal to pass optical signals to the network 26. A highly dispersive element can be employed between the photonic crystal and the network to ensure a wide frequency spread, strict data energy localization, and the terabit per second data rate entering the network 26.

Network

The communications network 26 in FIG. 1 receives the optical signals from the transmitter 22 and delivers the signals to the designated receiver 24. The network includes fiber optic cables, which preferably include low-loss photonic crystal fibers. A photonic crystal fiber provides a low non-linear threshold and provides an index profile that allows a stable, self-correcting soliton wave to be created therein. A soliton is a wave propagating in a medium, such as an optical fiber, where a tendency for the wave to disperse is counteracted by the non-linear properties of the medium. This results in a feedback loop that causes the wave to maintain its shape as it travels through the fiber. Near zero attenuation loss is attainable, allowing for a constant pulse width of less than 100 femtoseconds. The main data rate limiter, dispersion, is controlled by the low threshold solitonic pulse behavior in the photonic crystal optical fiber. Even so, signal dispersion in the optical fiber limits the reliable propagation distance to about 100 meters.

Optical repeaters can be used to maintain sufficient signal intensity and thereby increase the optical data highway reach well beyond 100 meters between nodes. Intensity thresholds of about four gigawatts per square centimeter are sufficient, and are well below common telecommunication intensities. Conversely, over short distances (centimeters), as can be employed in optical computing, hundreds of terabits per second bandwidths are realized in a single frequency without any need to boost the signal intensity. Consequently, the principles employed in this system can be applied to a local area network, a broader area network, or in a local microprocessor or optical computer.

The web of photonic crystal optical fibers forms an optical data highway between the nodes 28 in the network 26. The optical data highway, integrated with all-optical receiver and transmitter devices, provides an ultra-high bandwidth transmission rate of greater than $2 \times 10^{13}$ bits per second in a single frequency and greater than $10^{14}$ bits per second for multi-frequency communications over a single optical cable. The ultra-high-speed communications thus provided also are compatible with existing data encryption techniques, including dense wave division multiplexing (DWDM) techniques, for example, for multi-frequency improvements in data-transmission bandwidth.

Additional bandwidth can be provided depending on the selected communications protocol, and numerous quality-of-service (QOS) techniques can be applied to ensure that maximum bandwidth is utilized. The most easily-implemented technique is a time division scheme whereby each user is given a time slice and multiple users are iterated in a sequential fashion.

The network 26 can provide point-to-point communications between nodes 28, and/or parallel and/or serial node arrangements. As described below, only the receiver 24 with the lock bits that match the key bits can read the data signal. Each node 28 can test the identification bits in the key for a match. Unintended nodes can regenerate these bits via a standard solid state amplifier, such as an Erbium-doped fiber amplifier, before returning the signal to the network 26.

Receiver

The optical signals travel around the communications network 26 until they reach the optical signal receiver 24 identified in the key data. The receiver 24 decodes the data signal and converts it to an electronic signal that can be manipulated by an electronic computer. The receiver 24 thus provides an optical-to-electronic signal decoder.

To deliver both the key/data signal and the latch signal to the receiver, the communications network 26 connects to the receiver 24 along equal-length parallel paths, such as via a dual hollow-core photonic crystal fiber. In an analogy to the transmitter 22, the receiver 24 couples the light from the fiber optic cable to photonic crystal buffers.

Figure 4:
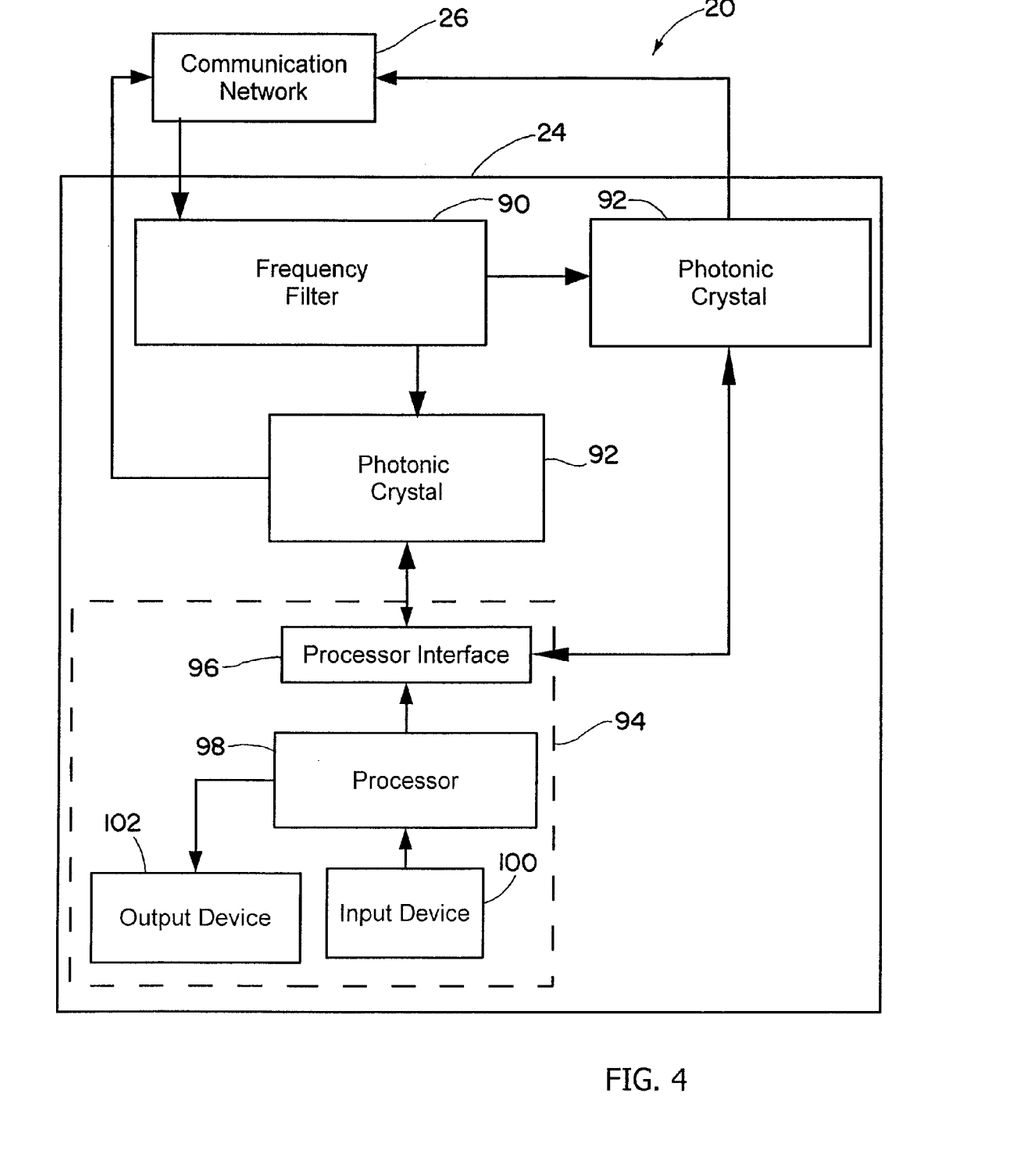
FIG. 4 is a schematic view of an exemplary optical signal receiver for use in the communication system of FIG. 1.

Referring now to FIG. 4, as with the transmitter 22, the receiver 24 can include a frequency filter 90, such as a frequency-separating photonic crystal with a plurality of waveguides that separate and guide received signals in different frequencies, and a plurality of data-receiving photonic crystals 92, each of which is connected to a particular frequency waveguide to receive signals in a particular frequency band.

A controller 94 is connected to each data-receiving photonic crystal 92 to receive the electronic data. The receiver controller 94 can be part of, the same as, or separate from a transmitter controller 34 (FIG. 2) at a common node 28 (FIG. 1) in the network 26. Like the transmitter controller 34, the receiver controller 94 includes a processor interface 96 in communication with the receiver photonic crystals 92, a processor 98 connected to the interface 96, and an input device 100 and an output device 102 connected to the receiver controller 94. The controller 94 receives the electronic data derived from the photonic data received in the photonic crystal 92.

Figure 5:
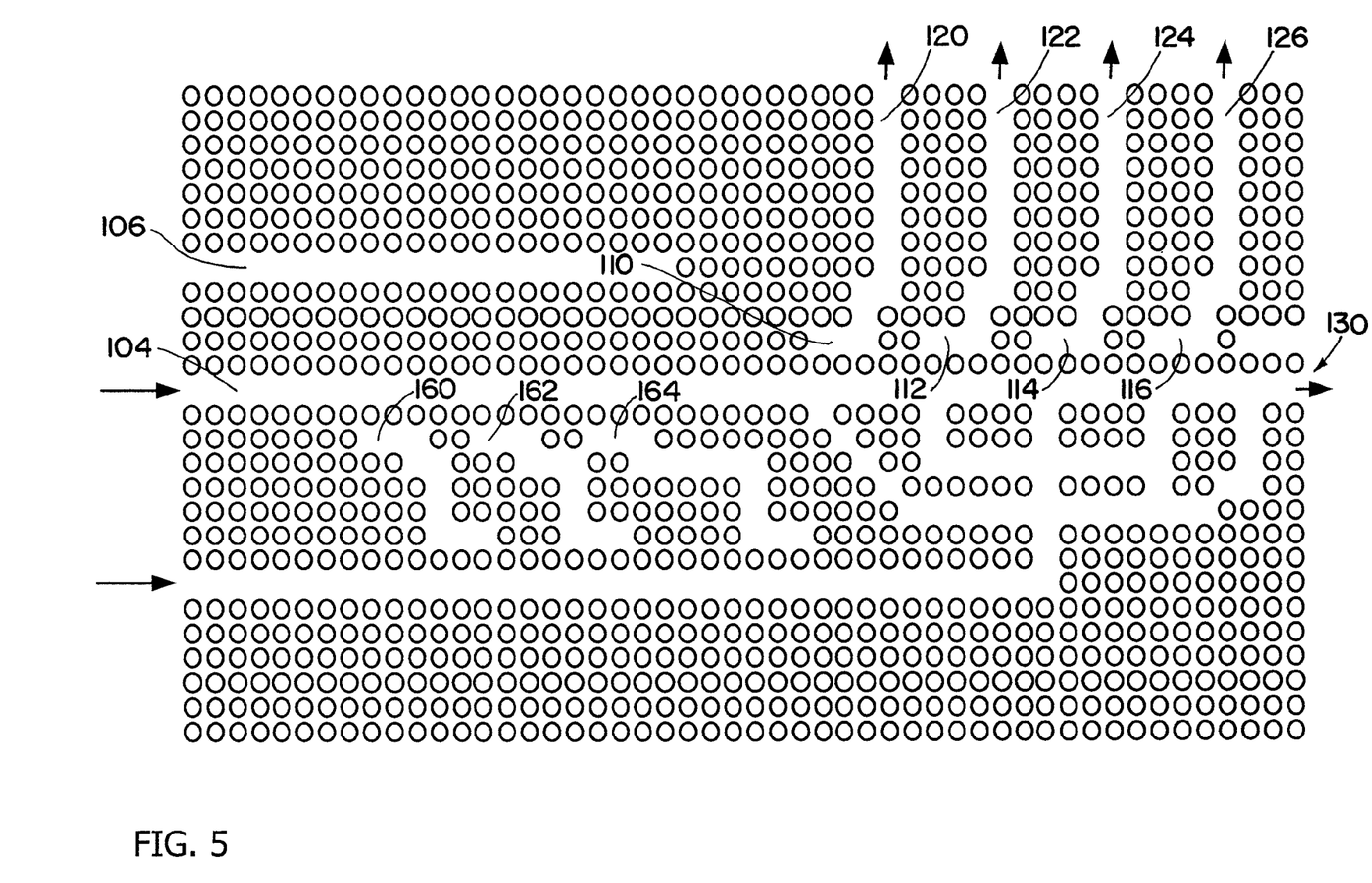
FIG. 5 is a plan view of an exemplary photonic crystal for use in the receiver of FIG. 4.

Referring to FIG. 5, the data-receiving photonic crystal 92 includes two linear defects that define waveguides, namely, a data/key waveguide 104 for receiving a data/key signal and a latch waveguide 106 for receiving a latch signal. The receiver photonic crystal 92 also has a plurality of resonant data read-out cavities 110, 112, 114, and 116 spaced along the key/data waveguide 104 to read out the optical data bits simultaneously along separate paths defined by respective waveguides 120, 122, 124, and 126 to a decoder or other processor interface that translates the optical data bits to electronic data bits. In contrast to the transmitter 22 (FIG. 2), in the receiver 24 the light is slowed via dispersion modification so that the energy in the receiver photonic crystal cavities 110, 112, 114, and 116 has a chance to build up sufficiently to be read out as electronic signals.

For pulses below threshold intensity, the key/data waveguide 104 and the latch waveguide 106 couple through the photonic crystal lattice so that essentially all of the data signal exits through the readout waveguides 120, 122, 124, and 126 to the processor interface. For pulses above threshold intensity, however, Kerr non-linearity induces a phase shift so that the key/data and latch waveguides 104 and 106 no longer couple. The data/key signal then proceeds to exit the receiver photonic crystal 92 at the outlet 130 of the data/key waveguide 104 to a network interface and returns to the network 26 (FIG. 4). The reverse status with respect to the threshold intensity alternatively may be true depending on the selected design. Accordingly, for pulses above or below the threshold intensity, the data is either read out or returned to the network.

Figure 6:
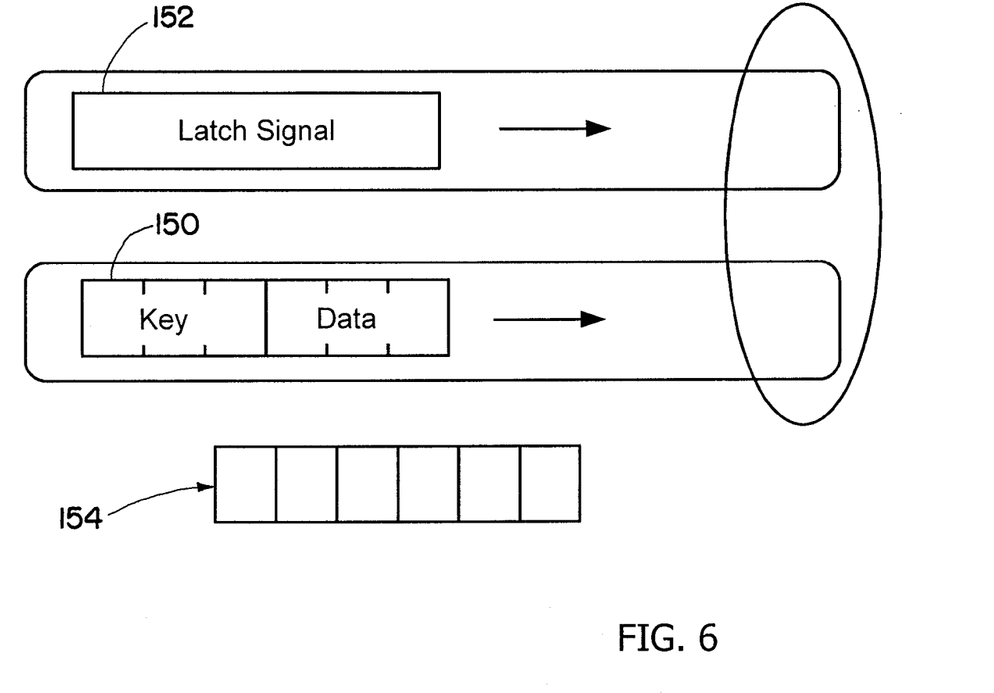
FIGS. 6-9 are schematic views of an optical signal, an optical signal transmission line, and a portion of an optical signal receiver that illustrate an exemplary method for receiving an optical signal.
Figure 7:
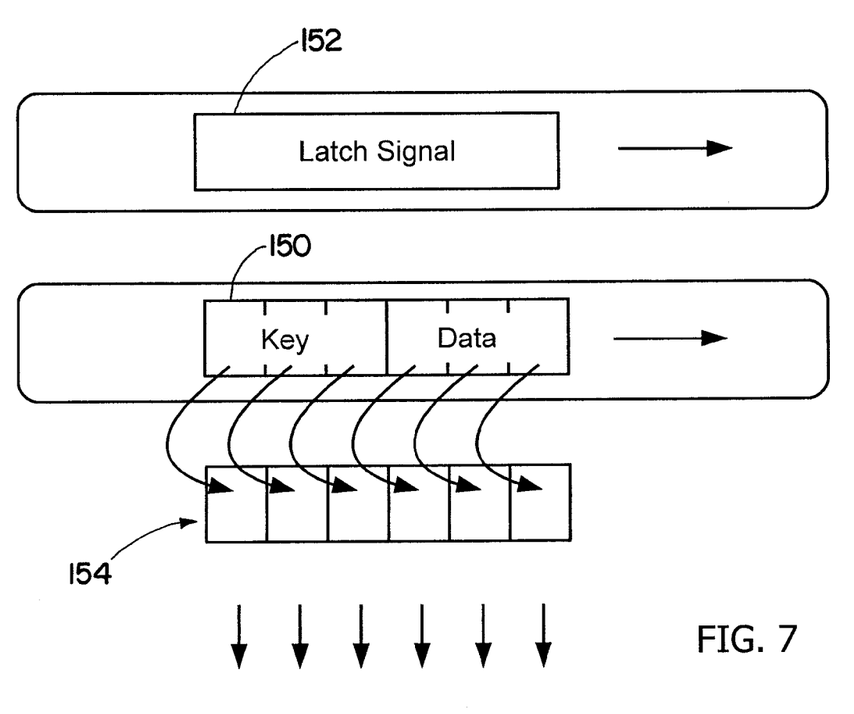
Figure 8:
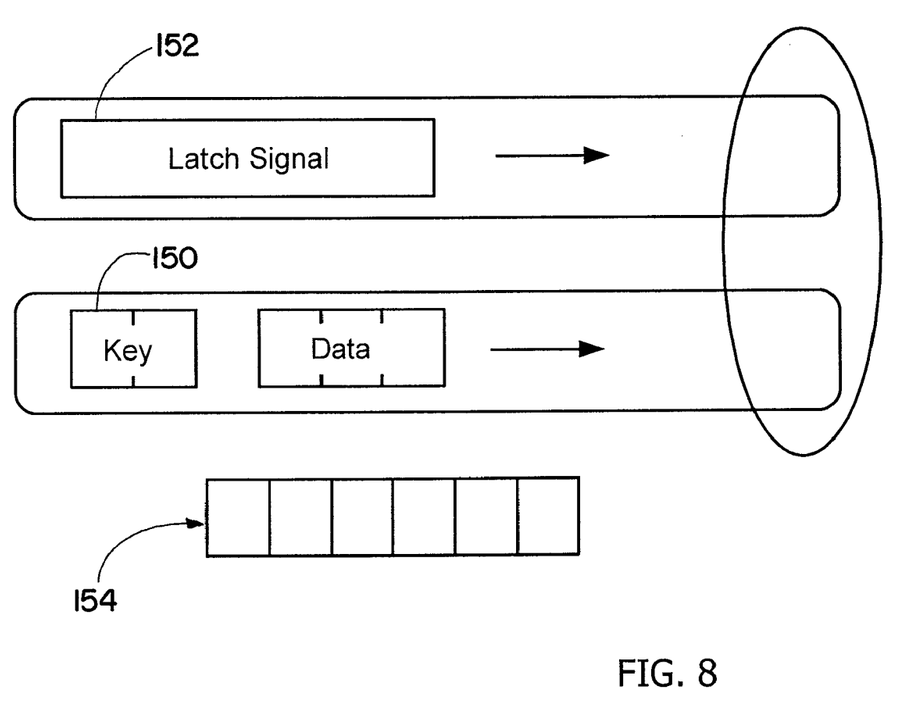
Figure 9:
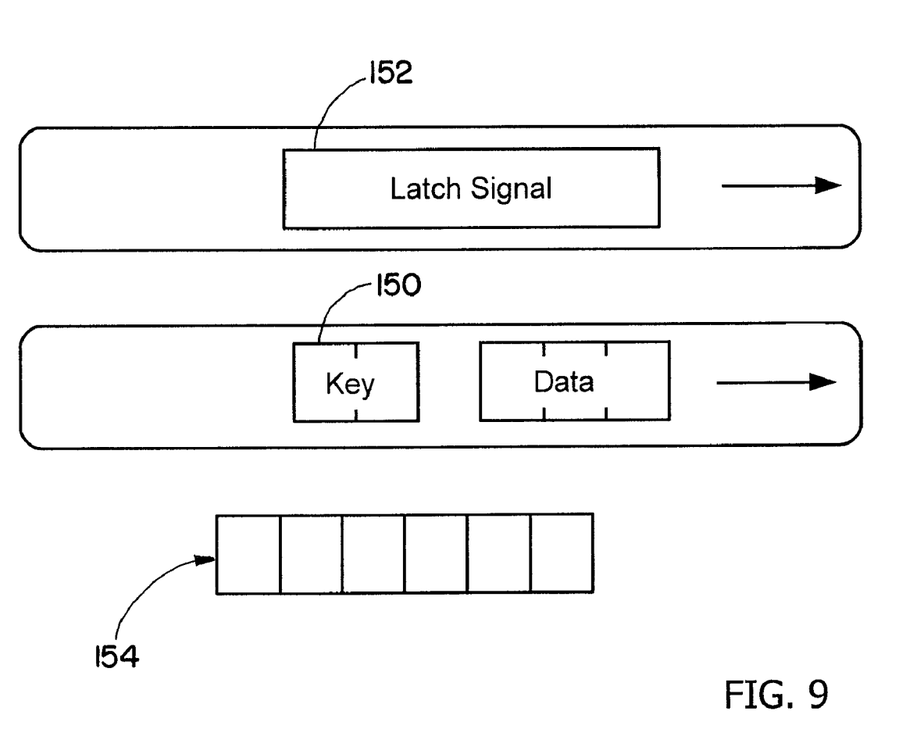

A sequential simplified illustration of the coupling process is shown in FIGS. 6-9. In FIGS. 6 and 7, a key/data signal packet 150 and a latch signal packet 152 arrive and pass over photonic crystal receiver cavities 154 in parallel substantially simultaneously. Since the latch signal packet 152 and the data/key packet 150 are the same length, the key/data packet 150 will be read out into the photonic crystal cavities 154 and from there the data can be read out for conversion into electronic signals. If there is a defect in the key/data packet 150 or the latch signal packet 152, as in FIGS. 8 and 9, the data cannot be read out and the latch signal and the key/data packet return to the network.

In addition to the requirements that the latch signal arrive at the same time as the data/key signal and that the latch signal must be the same length, the key also must match a lock signature in the receiver photonic crystal 92, which thereby ensures that the receiver 24 (FIG. 4) is the proper destination for the signal. The lock signature is defined by a physical structure of the receiver photonic crystal 92 (FIG. 5), and is compared to the key sent with the data. Only if the key matches the lock will the data signal couple into an adjacent cavity for reception by the decoder for translation into an electronic signal for output via the receiver controller 94 (FIG. 4).

Returning to FIG. 5, the receiver photonic crystal 92 includes one or more lock cavities 160, 162, and 164 adapted to compare the key bits to respective lock bits. The readout cavities 110, 112, 114, and 116 are spaced to read out the data bits simultaneously if (a) the data/key signal and the latch signal are received simultaneously, (b) the data/key signal and the latch signal have the same length, and (c) the key data bits in the key/data signal match the lock data bits. If one or more of these conditions are not met, the key/data signal is returned to the communications network 26. The lock combination is encoded into the receiver key/data waveguide 104 and lock cavities 160, 162, and 164 by selection of non-linear defect states. If the key bits match the lock bits in the lock cavities 160, 162, and 164, then Because the key in the key/data signal is never directly read by a network node processor, and the lock is physically encoded in the receiver photonic crystal, the system is inherently secure. The signals continue to traverse the network until they reach their intended destinations, and the data can only be read by a processor for the proper key/lock combination and latch synchronization described above. The physical structure of the receiver photonic crystal thus provides an inherent security that is not easily copied or altered.

Any attempt at reading the data without the proper key/lock combination will fail and can be detected, since the intruder interrupts the timing of the key/data signal and the clocked latch signal. An intensity change also is detectable every time an attempt is made to read the key/data signal.

The receiver photonic crystal illustrated in FIG. 5 is simplified to facilitate its description. An exemplary receiver photonic crystal has a bank of 1024 read-out cavities or cells. At the end of the 1024 cavities there is a control word lock, similar to an internet protocol address, that automatically enables another bank of photonic crystal cells to pass a data signal. These lock cells are arranged parallel to the waveguide bringing the photonic data into the bank of 1024 cells and are the last 32 cells in that bank of cells. These 32 bit lock cells will be transparent if the incoming key matches the expected address defined by the lock cells, which allows the optical signal to pass, which then triggers all the remaining cells to transfer energy representing the data signal from the resonant photonic crystal buffers and convert the energy in each cell into electronic signals for retrieval by the controller, which can save the data in an electronic clocked buffer circuit.

An exemplary data reception method includes the step of (i) receiving a data/key signal and a latch signal along parallel communication paths. As above, the data/key signal includes one or more data bits and one or more key bits. The method also includes the step of (ii) reading out the data bits from the key/data signal when (a) the data/key signal and the latch signal are received simultaneously, (b) the data/key signal and the latch signal have the same length, and (c) the key data bits in the key/data signal match predetermined lock data bits.

Accordingly, an exemplary method for optical data transmission includes the steps of (i) translating electronic data bits into optical data bits substantially simultaneously, (ii) spatially sequencing the optical data bits into an optical signal, and (iii) transmitting the optical signal. The translating step can include applying a control signal to a photonic crystal and shining a light onto the photonic crystal to simultaneously generate multiple optical data bits that correspond to multiple electronic data bits.

A corresponding data transmission method includes the step of transmitting a data/key signal and a latch signal simultaneously along parallel communication paths. The data/key signal has a length and includes at least two spatially displaced data bits, and the latch signal has the same overall length as the data/key signal.

And a corresponding method for receiving optical data including the steps of (i) receiving an optical signal having a sequence of spatially sequenced optical data bits, and (ii) reading the spaced optical data bits out of the optical signal substantially simultaneously.

In summary, the present invention provides a communication system 20 (FIG. 1) that includes a transmitter 22 (FIG. 2) with (i) a transmitter photonic crystal 30 (FIG. 2) having a waveguide 40 (FIG. 3) and multiple cavities 42, 44, and 46 (FIG. 3) spaced along the waveguide 40 (FIG. 3); (ii) a light source 32 (FIG. 2); and (iii) a controller 34 (FIG. 2) that controls the cavities 42, 44, and 46 (FIG. 3) to translate multiple electronic data bits to optical data bits simultaneously in respective cavities 42, 44, and 46 (FIG. 3) illuminated by the light source 32 (FIG. 2). A corresponding receiver 24 (FIG. 4) includes a receiver photonic crystal 92 (FIG. 5) having a data/key waveguide 104 (FIG. 5) for receiving a data/key signal and a latch waveguide 106 (FIG. 5) for receiving a latch signal. The photonic crystal 92 (FIG. 5) also includes data readout cavities 110, 112, 114, and 116 (FIG. 5) and lock cavities 160, 162, and 164 (FIG. 5) adapted to compare the key bits to respective lock bits. The data readout cavities 110, 112, 114, and 116 (FIG. 5) are spaced to read out the data bits simultaneously if (a) the data/key signal and the latch signal are received simultaneously, (b) the data/key signal and the latch signal have the same length, and (c) the key bits in the key/data signal match the lock bits.

While data security is desirable in many communications networks, this is particularly true in governmental communication systems. Another application that would benefit from fast and secure data transmission is in the transmission of digital information over a global network such as the internet. A specific application would be in the transmission of a large data file, such as high definition video images. At a rate of forty gigabits per second, a high definition movie can be transmitted in just a few seconds, and at terabit transmission speeds, in less than a second. Meanwhile, the sender can be assured that an unintended receiver cannot access the content of the transmission.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

We claim:

1. An optical signal transmitter, comprising (i) a photonic crystal having a waveguide and a plurality of defect sites spaced along the waveguide, where the waveguide includes a main channel and a plurality of branch channels, where the length of each branch channel is selected to sequentially space optical data bits as they travel along the branch and main channels of the waveguide and out of the photonic crystal as a substantially continuous optical signal; (ii) a light source arranged to direct light to the photonic crystal; and (iii) a controller that controls the defect sites in the photonic crystal to translate electronic data bits to optical data bits in respective defect sites illuminated by the light source.

2. A transmitter as set forth in claim 1, wherein the defect sites are cavities.

3. A transmitter as set forth in claim 1, wherein the length of each branch channel is progressively shorter further from an output end of the main channel.

4. A transmitter as set forth in claim 1, wherein the main channel and the branch channels are defined by line defects.

5. A transmitter as set forth in claim 1, wherein the light source includes a laser.

6. A transmitter as set forth in claim 1, wherein the light source includes a photonic laser integrated into a microprocessor chip with a photonic crystal that employs a channel defect sized to provide a frequency filter.

7. A transmitter as set forth in claim 1, wherein the light source includes a frequency filter.

8. A transmitter as set forth in claim 1, including multiple photonic crystals and the light source includes a frequency filter arranged to output different frequencies to different photonic crystals.

9. A transmitter as set forth in claim 1, wherein the controller includes an input device.

10. An optical signal receiver, comprising an optical-to-electronic signal decoder; and a photonic crystal having a waveguide for receiving an optical signal having a plurality of optical data bits, the photonic crystal also having a plurality of resonant cavities spaced along the waveguide to read out the optical data bits simultaneously along separate paths to the decoder, which translates the optical data bits to electronic data bits.

11. A receiver as set forth in claim 10, wherein the resonant cavities are coupled to parallel paths for simultaneous read out of optical data bits for conversion into electronic data bits.

12. A receiver as set forth in claim 10, wherein the photonic crystal includes an output connected to a controller.

13. A receiver as set forth in claim 10, including a plurality of waveguides that separate frequencies and a plurality of photonic crystals each of which is connected to a particular frequency waveguide.

14. An optical data transmission method, comprising the steps of translating electronic data bits into optical data bits substantially simultaneously, spatially sequencing the optical data bits into an optical signal, and transmitting the optical signal.

15. A method as set forth in claim 14, wherein the translating step includes applying a control signal to a photonic crystal and shining a light onto the photonic crystal to simultaneously generate multiple optical data bits that correspond to multiple electronic data bits.

16. An optical data reception method, comprising the steps of receiving an optical signal having a sequence of spatially sequenced optical data bits; and reading the spaced optical data bits out of the optical signal substantially simultaneously.

17. An optical data receiver comprising a photonic crystal having a data/key waveguide for receiving a data/key signal, the data/key signal including a plurality of spaced apart bits that include one or more data bits and one or more key bits; a latch waveguide for receiving a latch signal; one or more lock cavities adapted to compare the key bits to respective lock bits; and one or more data readout cavities spaced to read out the data bits simultaneously if (a) the data/key signal and the latch signal are received simultaneously, (b) the data/key signal and the latch signal have the same length, and (c) the key data bits in the key/data signal match the lock data bits.

18. A data transmission method, comprising the step of transmitting a data/key signal and a latch signal simultaneously along parallel communication paths, the data/key signal having a length and including at least two spatially displaced data bits, and the latch signal having the same overall length as the data/key signal.

19. A data reception method, comprising the steps of (i) receiving a data/key signal and a latch signal along parallel communication paths, where the data/key signal includes one or more data bits and one or more key bits; and (ii) reading out the data bits from the key/data signal when (a) the data/key signal and the latch signal are received simultaneously, (b) the data/key signal and the latch signal have the same length, and (c) the key data bits in the key/data signal match predetermined lock data bits.

* * * * *